(12) United States Patent
Allouche et al.

(10) Patent No.: US 10,087,107 B2
(45) Date of Patent: Oct. 2, 2018

(54) GEOPOLYMER WITH NANOPARTICLE RETARDANT AND METHOD

(71) Applicant: Louisiana Tech Research Corporation, Ruston, LA (US)

(72) Inventors: Erez Allouche, Ruston, LA (US); Yuri Lvov, Ruston, LA (US); Carlos Montes, Ruston, LA (US); Anupam Joshi, Ruston, LA (US)

(73) Assignee: Louisiana Tech Research Corporation, Ruston, LA (US)

( * ) Notice: Subject to any disclaimer, the term of this patent is extended or adjusted under 35 U.S.C. 154(b) by 94 days.

(21) Appl. No.: 15/423,110

(22) Filed: Feb. 2, 2017

(65) Prior Publication Data
US 2017/0144933 A1 May 25, 2017

Related U.S. Application Data

(62) Division of application No. 14/469,687, filed on Aug. 27, 2014, now Pat. No. 9,604,880.

(51) Int. Cl.
| | | |
|---|---|---|
| C04B 28/00 | (2006.01) | |
| C04B 14/04 | (2006.01) | |
| C04B 12/00 | (2006.01) | |
| C04B 20/10 | (2006.01) | |
| C04B 40/06 | (2006.01) | |
| C04B 14/06 | (2006.01) | |
| C04B 22/00 | (2006.01) | |
| C04B 22/06 | (2006.01) | |
| C04B 103/12 | (2006.01) | |
| C04B 103/22 | (2006.01) | |

(52) U.S. Cl.
CPC ............ *C04B 28/006* (2013.01); *C04B 12/00* (2013.01); *C04B 14/044* (2013.01); *C04B 14/06* (2013.01); *C04B 20/1033* (2013.01); *C04B 20/1074* (2013.01); *C04B 22/0093* (2013.01); *C04B 22/062* (2013.01); *C04B 40/0633* (2013.01); *C04B 2103/12* (2013.01); *C04B 2103/22* (2013.01); *Y02P 40/165* (2015.11); *Y02W 30/92* (2015.05)

(58) Field of Classification Search
CPC ..... C04B 28/006; C04B 14/044; C04B 14/06; C04B 12/00; C04B 20/1033; C04B 20/1074; C04B 40/0633; C04B 22/0093; C04B 22/062; C04B 2103/12; C04B 2103/22
See application file for complete search history.

(56) References Cited

U.S. PATENT DOCUMENTS

| | | | |
|---|---|---|---|
| 7,846,250 B2 | 12/2010 | Bartlet-Gouedard et al. | |
| 8,507,056 B2 | 8/2013 | Lvov et al. | |
| 8,512,468 B2 | 8/2013 | Allouche et al. | |
| 8,562,735 B2 | 10/2013 | Allouche et al. | |
| 8,586,512 B2 * | 11/2013 | Roddy | C04B 14/104 166/293 |
| 8,603,952 B2 * | 12/2013 | Roddy | C04B 14/104 106/718 |
| 9,192,912 B1 | 11/2015 | Mills et al. | |
| 9,242,900 B2 * | 1/2016 | Seo | C04B 12/005 |
| 9,416,052 B2 * | 8/2016 | Feldman | C04B 28/10 |
| 9,512,346 B2 * | 12/2016 | Roddy | C04B 7/527 |
| 9,604,880 B2 * | 3/2017 | Allouche | C04B 20/1033 |
| 2011/0223343 A1 | 9/2011 | Wang et al. | |

FOREIGN PATENT DOCUMENTS

| | | |
|---|---|---|
| EP | 2093200 A1 | 8/2009 |
| WO | 2005019130 A1 | 3/2005 |
| WO | 2014075134 A1 | 5/2014 |

OTHER PUBLICATIONS

PCT International Searching Authority/US, International Search Report, dated Nov. 30, 2015, for PCT/US2015/46302, "Geopolymer with Nanoparticle Retardant".
PCT International Searching Authority/US, Written Opinion of the International Searching Authority, dated Nov. 30, 2015, for PCT/US2015/46302, "Geopolymer with Nanoparticle Retardant".

* cited by examiner

*Primary Examiner* — Anthony J Green
(74) *Attorney, Agent, or Firm* — Jones Walker LLP

(57) ABSTRACT

A method of controlling the setting time of a geopolymer by coating aluminosilicate particles with nanoparticles to slow the geopolymerization reaction. The coating effectiveness of the nanoparticles may be enhanced by pretreating the aluminosilicate particles with a layer-by-layer assembly of polyelectrolytes. A geopolymer is formed by mixing about 39% to about 66% by weight aluminosilicate source, about 0% to about 40% by weight sand, about 19% to about 33% by weight of alkali activator solution, and about 1% to about 4% nanoparticles.

11 Claims, 15 Drawing Sheets

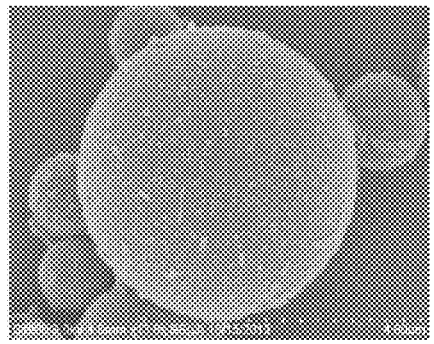
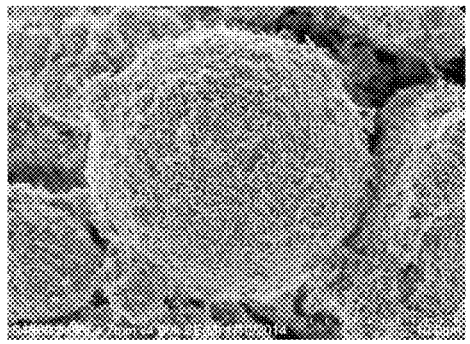
Fig. 4A	Fig. 4B
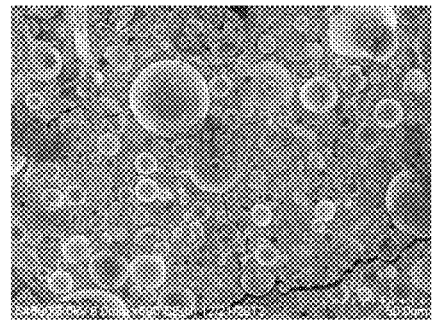
Fig. 5
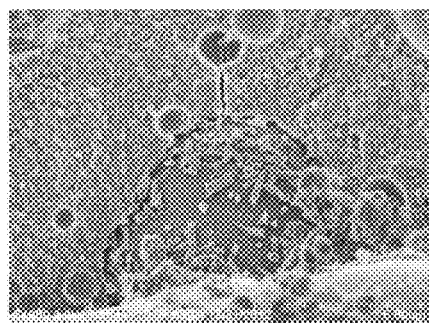
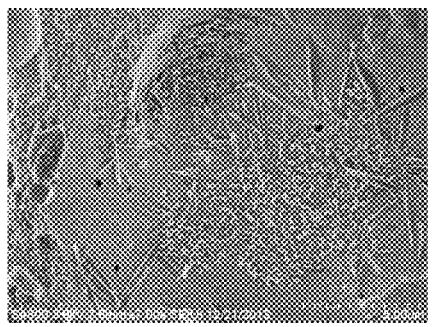
Fig. 6A	Fig. 6B

GEOPOLYMER WITH NANOPARTICLE RETARDANT AND METHOD

CROSS-REFERENCE TO RELATED APPLICATIONS

This application is a divisional of and claims priority to U.S. patent application Ser. No. 14/469,687, filed on Aug. 27, 2014 now U.S. Pat. No. 9,604,880.

STATEMENT REGARDING FEDERALLY SPONSORED RESEARCH OR DEVELOPMENT

The invention described herein was made with support of the U.S. Government, and the U.S. Government may have certain rights in the invention as provided for by the terms of i6 Grant No. 08-79-0431 granted by the U.S. Department of Commerce, Economic Development Administration.

BACKGROUND

One of the barriers to large-scale commercialization of geopolymer binders in the construction industry is the lack of effective admixtures, particularly retardants, capable of providing longer and more predicted setting times. Retarders are admixtures that slow down the hardening of the cement paste. Retarders commonly used in the Portland Cement industry, such as modified lignosulfonates and carbohydrate derivatives, are generally ineffective when added to geopolymer paste, mortar, or concrete formulations.

To control the setting times of geopolymer pastes, researchers and practitioners commonly use sodium borate decahydrate (i.e., Borax) or sodium pentaborate decahydrate, but results with these retarders are variable. Also, use of more than a few percentage of Borax by weight of the aluminosilicate source is associated with significant reduction in mechanical strength.

BRIEF DESCRIPTION OF THE DRAWINGS

FIGS. 4A and 4B are SEM images of a dry mixture of layer-by-later treated fly ash and 6% halloysite nanotubes by weight of fly ash.

FIG. 5 is an SEM image of a geopolymer paste control sample prepared with a 10M sodium hydroxide solution.

FIGS. 6A and 6B are SEM images of a geopolymer paste sample prepared with 3% halloysite nanotubes based on a fly ash weight and a 10M sodium hydroxide solution.

DETAILED DESCRIPTION OF SELECTED EMBODIMENTS

A widely accepted model for the geopolymerization reaction mechanism includes three steps: speciation, gelation, and polymerization. The speciation step includes the alkaline hydrolysis of a solid aluminosilicate source (e.g., fly ash, metakaolin, rice husk), which liberates monomeric aluminate and silicate species into the solution phase. In the gelation step, the aluminate and silicate species, in addition to the silicate from the activator solution, form a complex gel-like mixture via condensation. The polymerization step includes the growth of the gel connectivity via large scale cross-linking and rearrangement accompanied by a continuous condensation leading to a three-dimensional network referred to as the geopolymer. The conventional understanding of the geopolymer reaction postulates a simultaneous occurrence of gelation and large scale polymerization.

Experimental data illustrated that a large scale step like polymerization begins only after the more localized gelation has reached equilibrium, indicating that gelation and polymerization are substantially non-concurrent processes and that the initial gelation process is the rate-controlling step in the curing process (i.e., the geopolymerization reaction). The initial stage of the conversion of the aluminosilicate source to an amorphous binder via activation using a highly alkali solution consisted predominantly of localized morphological changes, which are consistent with the particle-to-gel conversion (i.e., gelation) on the surface of the aluminosilicate source particles.

A method of controlling the rate of the gelation step of a geopolymerization reaction includes coating aluminosilicate particles partially or completely with nanoparticles prior to or following the introduction of an alkali activator solution. The nanoparticles act as a retardant by protecting the surface of the aluminosilicate particles against the action of the alkali activator solution, which results in the dissolution of the surface of the aluminosilicate particles. Controlling the rate of dissolution of the surface of the aluminosilicate particles in the gelation step may allow control over a range of rheological properties of the fresh geopolymer paste, including initial and final setting times, flowability/pumpability, and thickening, at ambient or moderately elevated temperatures.

Figure 1A:
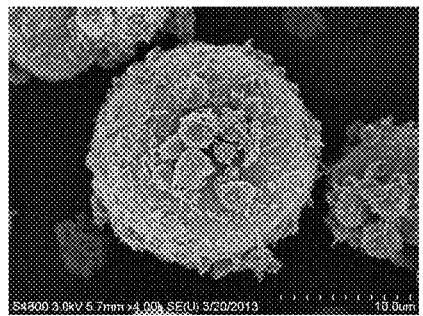
FIGS. 1A and 1B are SEM images of a dry mixture of fly ash and 3% halloysite nanotubes by weight of fly ash.
Figure 1B:
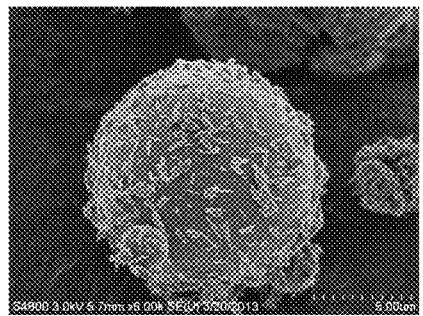
Figure 2A:
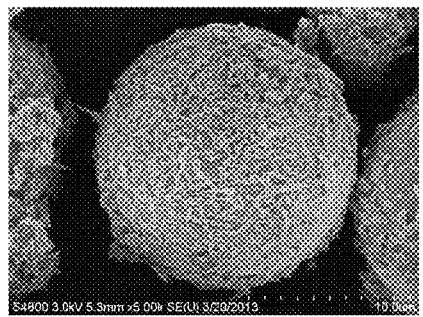
FIGS. 2A and 2B are SEM images of a dry mixture of fly ash and 6% halloysite nanotubes by weight of fly ash.
Figure 2B:
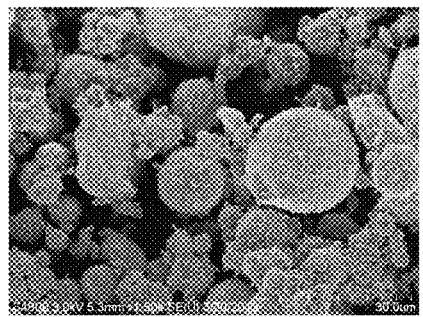

FIGS. 1A and 1B show SEM images of a dry mixture of fly ash and 3% halloysite nanotubes by weight of the fly ash. FIGS. 2A and 2B show SEM images of a dry mixture of fly ash and 6% halloysite nanotubes by weight of the fly ash. FIGS. 1A-2B show the strong attraction between the halloysite nanotubes and the fly ash particles. The zeta potential (i.e., the electrostatic attraction) of fly ash may be around +23 mV, while the zeta potential of halloysite is around −60 mV. FIGS. 1A and 1B show that use of 3% halloysite nanotubes by weight of the fly ash results in the halloysite nanotubes partially coating the fly ash particles. FIGS. 2A and 2B show that use of 6% halloysite nanotubes by weight of the fly ash results in the halloysite nanotubes substantially coating the fly ash particles.

However, the zeta potential of fly ash is largely variable, which contributes to the limited effectiveness of set retarding agents in retarding the geopolymerization reaction. The effectiveness of the nanoparticle coating may be controlled and enhanced by using layer-by-layer (LbL) assembly of polyelectrolytes. LbL assembly involves deposition of oppositely charged polyions onto a substrate surface. If a substrate such as fly ash is positively charged, it will have a strong attraction of a negatively charged polyion such as polyacrylic acid (PAA) or polystyrene sulfonate (PSS). Usually the assembly is performed at room temperature with a local solution pH of 7.0. The modified surface will have a negative charge that will strongly attract positively charged polyions such as polyethylenimine (PEI) or polydiallyldimethyl ammonium chloride (PDDA). The use of LbL assembly is a way to create a larger zeta potential difference between the fly ash particle and the nanoparticles, thus enhancing the coating process and the delay in setting time.

Figure 3:
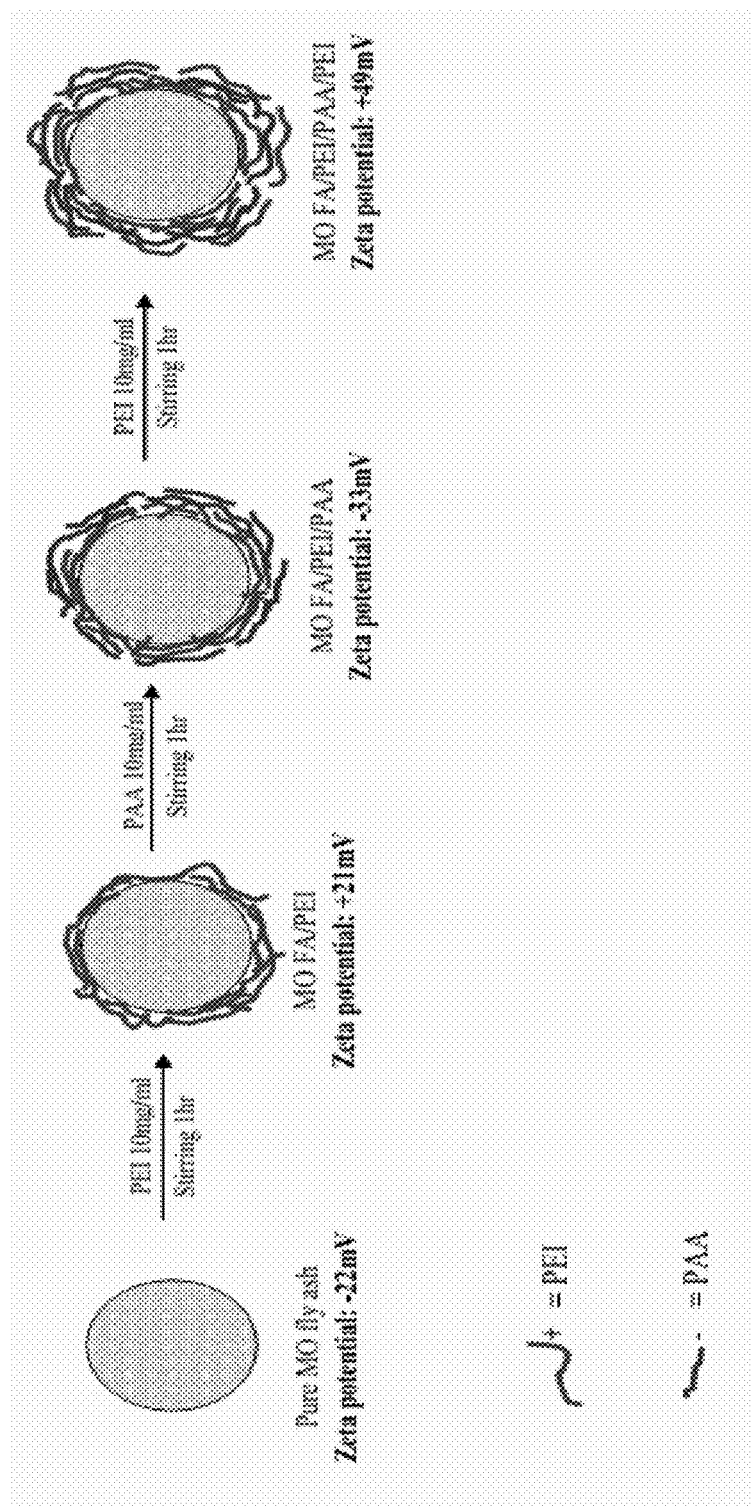
FIG. 3 is a schematic illustration of an layer-by-layer process of applying polyelectrolytes to a fly ash surface.
Figure 7A:
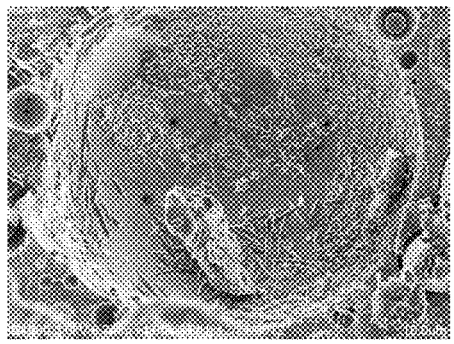
FIGS. 7A-7D are SEM images of geopolymer paste samples prepared with 3% halloysite nanotubes based on a fly ash weight and a 12M sodium hydroxide solution.
Figure 7B:
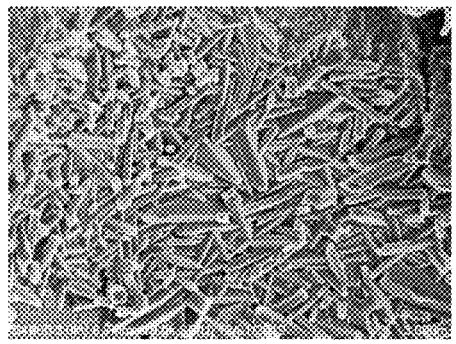
Figure 7C:
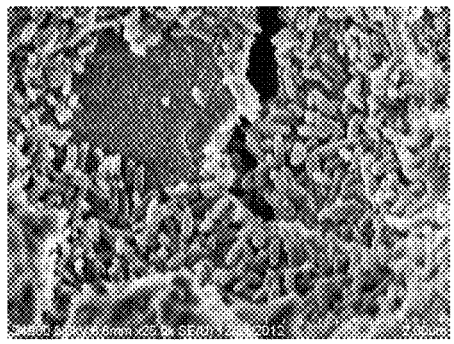
Figure 7D:
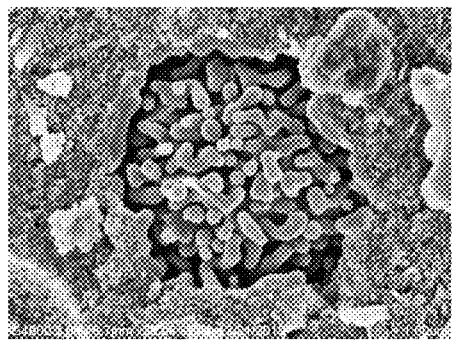

FIG. 3 is a schematic illustration of the LbL assembly of polyelectrolytes on a fly ash surface having a negative zeta potential. The fly ash may be treated with a positive polyion, such as PEI, then a negative polyion, such as PAA, and finally another positive polyion, such as PEI. In this way, the LbL assembly of polyelectrolytes modifies the zeta potential of the fly ash from −22 mV to +49 mV in order to allow for coating of the fly ash surface with nanoparticles having negative zeta potentials (e.g., halloysite nanotubes having a zeta potential of around −60 mV or kaolin nanoclay particles having a zeta potential of around −19 mV). FIG. 4A shows an SEM image of a dry mixture of fly ash and 6% halloysite nanotubes by weight of the fly ash, while FIG. 4B shows an SEM image of the same dry mixture except that the fly ash was treated with the LbL assembly of polyelectrolytes before the addition of the 6% halloysite nanotubes. A comparison of the two images shows that the LbL treatment of the fly ash leads to greater attraction of the halloysite particles.

Geopolymer paste samples 1A were prepared by premixing for approximately 30 seconds 20 grams of fly ash (e.g., Dolet Hills fly ash) with halloysite nanotubes in an amount that was 3% of the fly ash weight. The dry mixture of fly ash and halloysite was then mixed with sodium silicate for approximately 30 seconds. The sodium silicate used was Silicate N from PQ. A sodium hydroxide solution was then added for approximately 30 seconds. Geopolymer paste samples 1A were prepared with sodium hydroxide solutions having varying concentrations, namely, 10M, 12M, and 14M solutions. The amounts of the sodium silicate and the sodium hydroxide solution were determined using a silicate to hydroxide weight ratio of 1.5 and an activator solution (i.e., sodium silicate and sodium hydroxide solution combined) to fly ash ratio of 0.5. Geopolymer paste samples 1A were mixed until a homogeneous mixture was achieved. Rheology tests were conducted five minute after the beginning of the mixing.

Geopolymer paste samples 1B were prepared in the same manner as geopolymer paste samples 1A, except that in geopolymer paste samples 1B, the halloysite nanotubes were added in an amount that was 6% of the fly ash weight.

Geopolymer paste samples 1B-LbL were prepared by first treating the fly ash with an LbL assembly of polyelectrolytes. Specifically, the fly ash surface was modified using PEI and PAA. For a 100 g sample, PEI and PAA solutions with concentrations of 100 mg/mL were prepared in DI water containing 1 mg/mL NaCl. After each polyelectrolyte coating, the sample was sonicated for 5 minutes to break conglomerates. The sample was then stirred on a magnetic stirrer for 1 hour followed by washing with DI water once and centrifugation. Supernatant was discarded in each case. Zeta potential measurements after each washing showed the polyelectrolyte coating. The sample was dried in vacuum for 2 days to ensure complete drying. The subsequent preparation of the geopolymer paste samples 1B-LbL was identical to the preparation of the geopolymer samples 1B. Rheological tests were conducted at 50° C. for these samples.

Geopolymer paste samples 2A were prepared by mixing for approximately 30 seconds 20 grams of fly ash (e.g., Dolet Hills fly ash) with sodium silicate. The sodium silicate used was Silicate N from PQ. A sodium hydroxide solution was then added for approximately 30 seconds. Geopolymer paste samples 2A were prepared with sodium hydroxide solutions having varying concentrations, namely, 10M, 12M, and 14M solutions. The amounts of sodium silicate and the sodium hydroxide solution were determined using a silicate to hydroxide weight ratio of 1.5 and an activator solution (i.e., sodium silicate and sodium hydroxide solution combined) to fly ash ratio of 0.5. Halloysite nanotubes were then added in an amount that was 3% of the fly ash weight. Geopolymer paste samples 2A were mixed until a homogeneous mixture was achieved. Rheology tests were conducted five minutes after the beginning of the mixing.

Geopolymer paste samples 2B were prepared in the same manner as geopolymer paste samples 2A, except that in geopolymer paste samples 2B, the halloysite nanotubes were added in an amount that was 6% of the fly ash weight.

Geopolymer mortar samples 1A were prepared by premixing for approximately 30 seconds 500 grams of fly ash (e.g., Dolet Hills fly ash) with halloysite nanotubes in an amount that was 3% of the fly ash weight. The dry mixture of fly ash and halloysite was then mixed with sodium silicate at Speed 1 with an ASTM standard mixer for approximately 30 seconds. The sodium silicate used was Silicate N from PQ. Then 500 grams of sand was added evenly for approximately 30 seconds. A sodium hydroxide solution was then added for approximately 30 seconds. Geopolymer mortar samples 1A were prepared with sodium hydroxide solutions having varying concentrations, namely, 10M, 12M, and 14M solutions. The amounts of sodium silicate and the sodium hydroxide solution were determined using a silicate to hydroxide weight ratio of 1.5 and an activator solution (i.e., sodium silicate and sodium hydroxide solution combined) to fly ash ratio of 0.5. The mixing was discontinued for a rest period of approximately 90 seconds. Then the mixture was mixed at Speed 2 with an ASTM standard mixer for approximately 60 seconds.

Geopolymer mortar samples 1B were prepared in the same manner as geopolymer mortar samples 1A, except that in geopolymer mortar samples 1B, the halloysite nanotubes were added in an amount that was 6% of the fly ash weight.

Geopolymer mortar samples 2A were prepared by mixing 500 grams of fly ash (e.g., Dolet Hills fly ash) with sodium silicate at Speed 1 with an ASTM standard mixer for approximately 30 seconds. The sodium silicate used was Silicate N from PQ. Then 500 grams of sand was added evenly for approximately 30 seconds. A sodium hydroxide solution was then added for approximately 30 seconds. Geopolymer mortar samples 2A were prepared with sodium hydroxide solutions having varying concentrations, namely, 10M, 12M, and 14M solutions. The amounts of sodium silicate and the sodium hydroxide solution were determined using a silicate to hydroxide weight ratio of 1.5 and an activator solution (i.e., sodium silicate and sodium hydroxide solution combined) to fly ash ratio of 0.5. Halloysite nanotubes were then added to the mixture and mixing was continued for approximately 30 seconds. The halloysite nanotubes were added in an amount that was 3% of the fly ash weight. The mixing was discontinued for a rest period of approximately 90 seconds. Then the mixture was mixed at Speed 2 with an ASTM standard mixer for approximately 60 seconds.

Geopolymer mortar samples 2B were prepared in the same manner as geopolymer mortar samples 2A, except that in geopolymer mortar samples 2B, the halloysite nanotubes were added in an amount that was 6% of the fly ash weight.

Geopolymer paste control samples and geopolymer mortar control samples were also prepared using the same procedures as described above, except with 0% halloysite nanotubes.

FIG. 5 shows an SEM image of a geopolymer paste control sample prepared with 10M sodium hydroxide solution. Many of the fly ash particles remain unreacted. FIGS. 6A and 6B show SEM images of geopolymer paste samples prepared with 3% halloysite nanotubes based on the fly ash weight and a 10M sodium hydroxide solution. The halloysite nanotubes were found to exhibit preference to surrounding fly ash particles or in the pores of the geopolymer paste. The halloysite nanotube geometry in the geopolymer paste was found to be identical to that of the raw halloysite nanotube, showing the ability of halloysite nanotubes to survive the alkaline conditions of the activator solution and to retain its shape without combining with the geopolymer paste.

FIGS. 7A-7D show SEM images of geopolymer paste samples prepared with 3% halloysite nanotubes based on the fly ash weight and a 12M sodium hydroxide solution. These images also show the halloysite nanotubes surrounding the fly ash particles and being positioned in pores, but some of the halloysite nanotubes in these samples were rounded in shape. The change in the halloysite nanotube geometry may be attributed to attack by the alkali activator solution.

Figure 8:
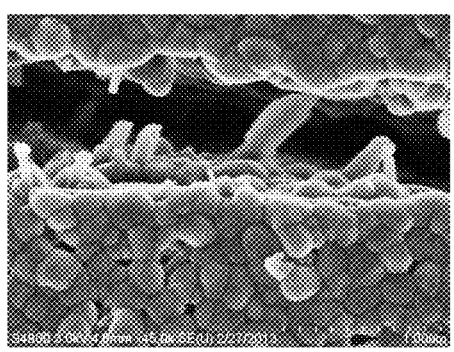
FIG. 8 is an SEM image of a geopolymer paste sample 1A prepared with a 10M sodium hydroxide solution.
Figure 9:
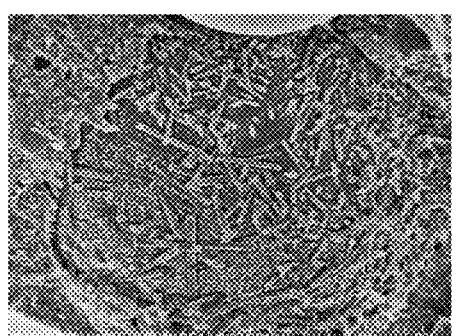
FIG. 9 is an SEM image of a geopolymer paste sample 1A prepared with a 12M sodium hydroxide solution.
Figure 10:
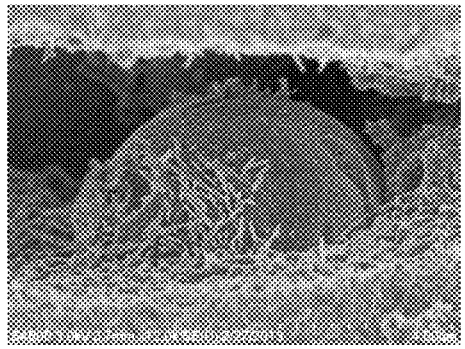
FIG. 10 is an SEM image of a geopolymer paste sample 1A prepared with a 14M sodium hydroxide solution.

FIG. 8 shows an SEM image of a geopolymer paste sample 1A (i.e., 3% halloysite nanotubes based on the fly ash weight, and premixing of halloysite nanotubes with fly ash) prepared with a 10M sodium hydroxide solution. The halloysite nanotubes are found in the cracks of the geopolymer paste. FIG. 9 shows an SEM image of a geopolymer paste sample 1A prepared with a 12M sodium hydroxide solution, and FIG. 10 shows an SEM image of a geopolymer paste sample 1A prepared with a 14M sodium hydroxide solution. The halloysite nanotubes in FIGS. 9 and 10 are found most preferentially surrounding fly ash particles, and no significant change in the shape of the halloysite nanotubes is shown. FIGS. 8-10 show that halloysite nanotubes coated the fly ash particles better in the geopolymer paste samples 1A prepared with 12M and 14M sodium hydroxide solutions than in the geopolymer paste sample 1A prepared with 10M sodium hydroxide solution.

Figure 11:
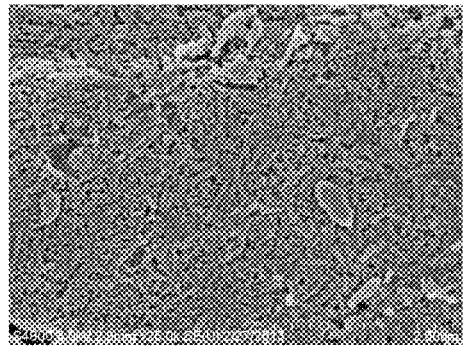
FIG. 11 is an SEM image of a geopolymer paste sample 1B prepared with a 10M sodium hydroxide solution.
Figure 12:
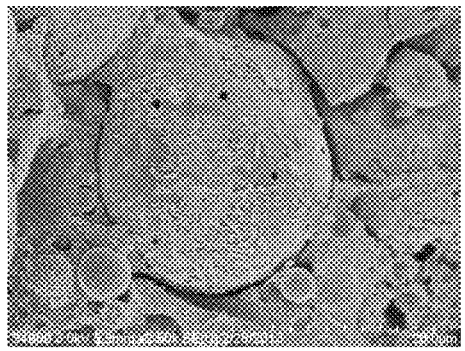
FIG. 12 is an SEM image of a geopolymer paste sample 1B prepared with a 12M sodium hydroxide solution.
Figure 13:
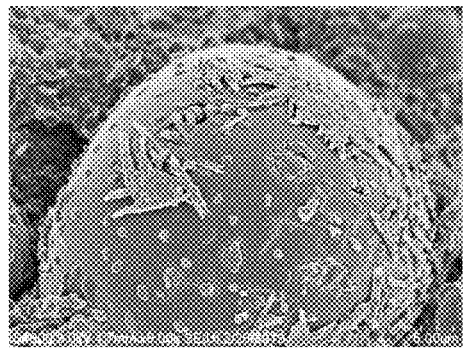
FIG. 13 is an SEM image of a geopolymer paste sample 1B prepared with a 14M sodium hydroxide solution.

FIG. 11 shows an SEM image of a geopolymer paste sample 1B (i.e., 6% halloysite nanotubes based on the fly ash weight, and premixing of halloysite nanotubes with fly ash) prepared with a 10M sodium hydroxide solution. FIG. 12 shows an SEM image of a geopolymer paste sample 1B prepared with a 12M sodium hydroxide solution, and FIG. 13 shows an SEM image of a geopolymer paste sample 1B prepared with a 14M sodium hydroxide solution. The halloysite nanotubes in FIGS. 11-13 formed agglomerates and interacted with one another, but exhibited preference to coating fly ash particles. FIGS. 8-13 show that use of 6% halloysite nanotubes based on the fly ash weight allows for coating a larger portion of the fly ash particles than use of 3% halloysite nanotubes based on the fly ash weight.

Figure 14:
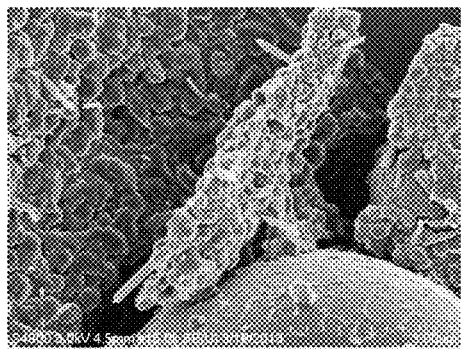
FIG. 14 is an SEM image of a geopolymer paste sample 2A prepared with a 10M sodium hydroxide solution.
Figure 15:
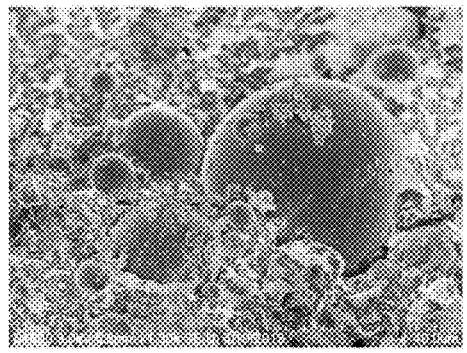
FIG. 15 is an SEM image of a geopolymer paste sample 2A prepared with a 12M sodium hydroxide solution.
Figure 16:
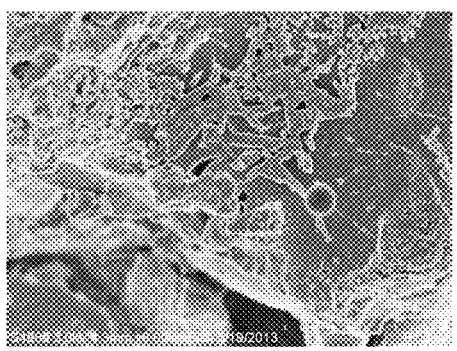
FIG. 16 is an SEM image of a geopolymer paste sample 2A prepared with a 14M sodium hydroxide solution.

FIG. 14 shows an SEM image of a geopolymer paste sample 2A (i.e., 3% halloysite nanotubes based on the fly ash weight, and mixing halloysite nanotubes into the geopolymer paste) prepared with a 10M sodium hydroxide solution. FIG. 15 shows an SEM image of a geopolymer paste sample 2A prepared with a 12M sodium hydroxide solution, and FIG. 16 shows an SEM image of a geopolymer paste sample 2A prepared with a 14M sodium hydroxide solution. FIGS. 14-16 show the halloysite nanotubes embedded in the geopolymer matrix with less halloysite nanotubes coating the fly ash particles than in FIGS. 4-9 (i.e., geopolymer paste samples 1A and 1B). The halloysite nanotubes in FIG. 16 appear deformed and adhered together, potentially due to attack by the 14M sodium hydroxide solution on the halloysite nanotube surface.

Figure 17:
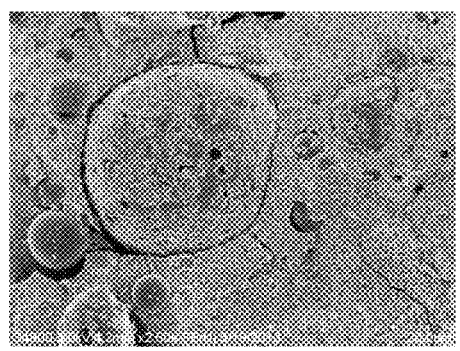
FIG. 17 is an SEM image of a geopolymer paste sample 2B prepared with a 10M sodium hydroxide solution.
Figure 18:
FIG. 18 is an SEM image of a geopolymer paste sample 2B prepared with a 12M sodium hydroxide solution.
Figure 19:
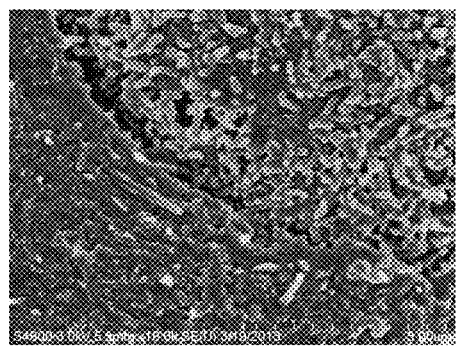
FIG. 19 is an SEM image of a geopolymer paste sample 2B prepared with a 14M sodium hydroxide solution.

FIG. 17 shows an SEM image of a geopolymer paste sample 2B (i.e., 6% halloysite nanotubes based on the fly ash weight, and mixing halloysite nanotubes into the geopolymer paste) prepared with a 10M sodium hydroxide solution. FIG. 18 shows an SEM image of a geopolymer paste sample 2B prepared with a 12M sodium hydroxide solution, and FIG. 19 shows an SEM image of a geopolymer paste sample 2B prepared with a 14M sodium hydroxide solution. FIGS.

17-19 show the halloysite nanotubes both coating the fly ash particles and embedded in the geopolymer paste. The halloysite nanotubes in FIG. 19 appear deformed, potentially due to attack by the 14M sodium hydroxide solution on the halloysite nanotube surface.

Compressive strength tests were conducted on geopolymer paste samples made with 10M, 12M, and 14M sodium hydroxide solutions 24 hours after preparation. Samples were prepared according to standard ASTM C-109 and tested using a universal compression testing machine after. Table 1 shows the results of the compressive strength tests.

TABLE 1

| NaOH Soln. Conc. | Geopolymer Paste Control | Geopolymer Paste 1A (3% halloysite) | Geopolymer Paste 1B (6% halloysite) | Geopolymer Paste 2A (3% halloysite) | Geopolymer Paste 2B (6% halloysite) |
|---|---|---|---|---|---|
| 10M | 8,697 psi | 6,796 psi | 6,807 psi | 8,189 psi | 6,705 psi |
| 12M | 9,017 psi | 6,147 psi | 6,573 psi | 8,280 psi | 8,525 psi |
| 14M | 9,929 psi | 4,059 psi | 5,033 psi | 8,450 psi | 8,615 psi |

Figure 20:
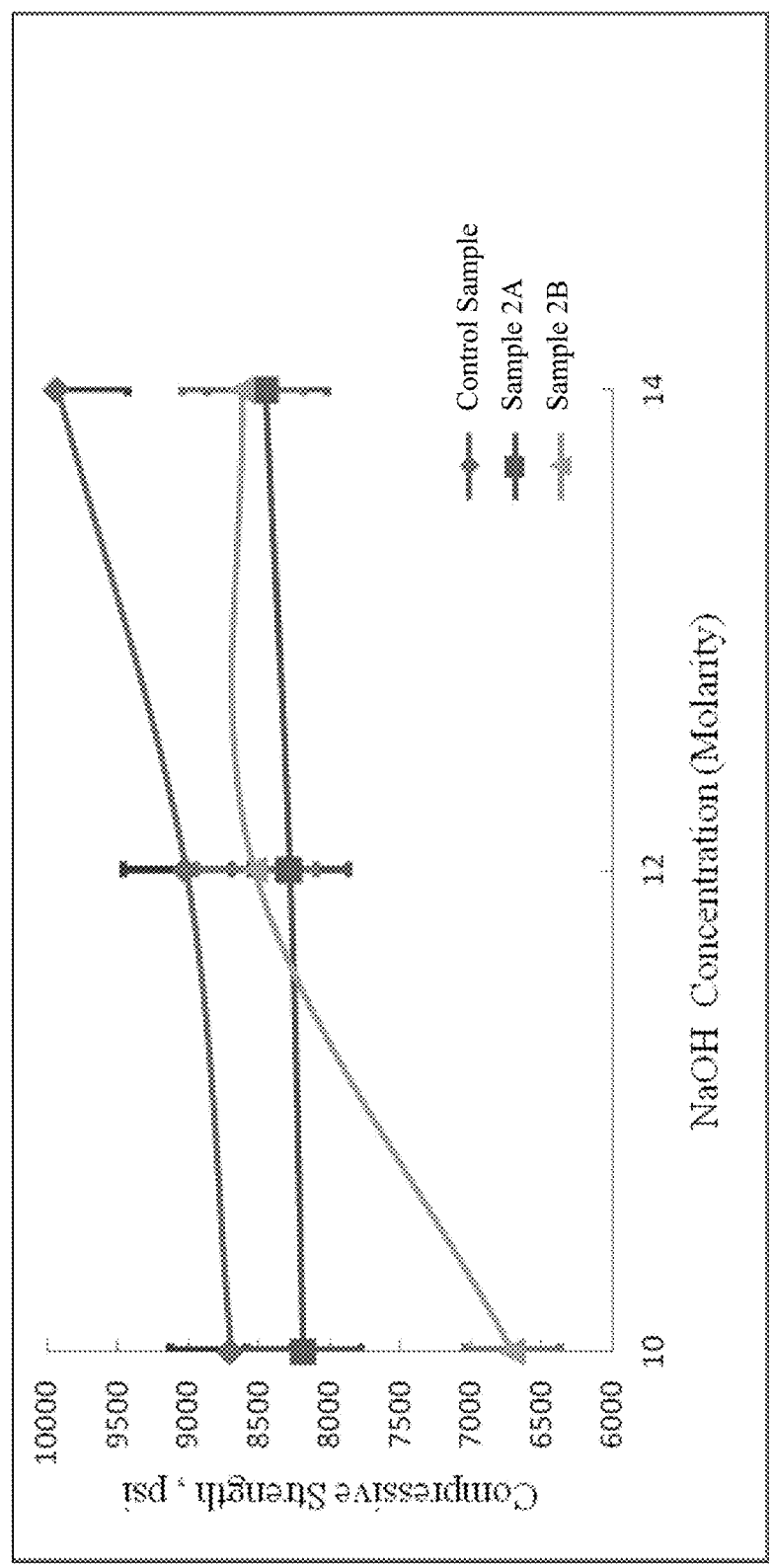
FIG. 20 is a graphical comparison of compressive strength test results for geopolymer paste control samples, geopolymer paste samples 2A, and geopolymer paste samples 2B prepared with 10M, 12M, and 14M sodium hydroxide solutions.

FIG. 20 graphically compares the compressive strength results for the geopolymer paste control samples, geopolymer paste samples 2A, and geopolymer paste samples 2B at each NaOH concentration. The compressive strength of the geopolymer paste control samples increased with increasing concentration of the sodium hydroxide solution. Geopolymer paste samples 2A and 2B having 3% and 6% halloysite nanotubes by weight of fly ash, respectively, exhibited reduced compressive strength as compared to the geopolymer paste control samples at each NaOH concentration. Geopolymer paste samples 2B having 6% halloysite nanotubes by weight of fly ash exhibited a much larger reduction in compressive strength than geopolymer paste samples 2A having 3% halloysite nanotubes by weight of fly ash at 10M NaOH concentration, but a similar reduction in compressive strength at 12M and 14M NaOH concentrations.

Figure 21:
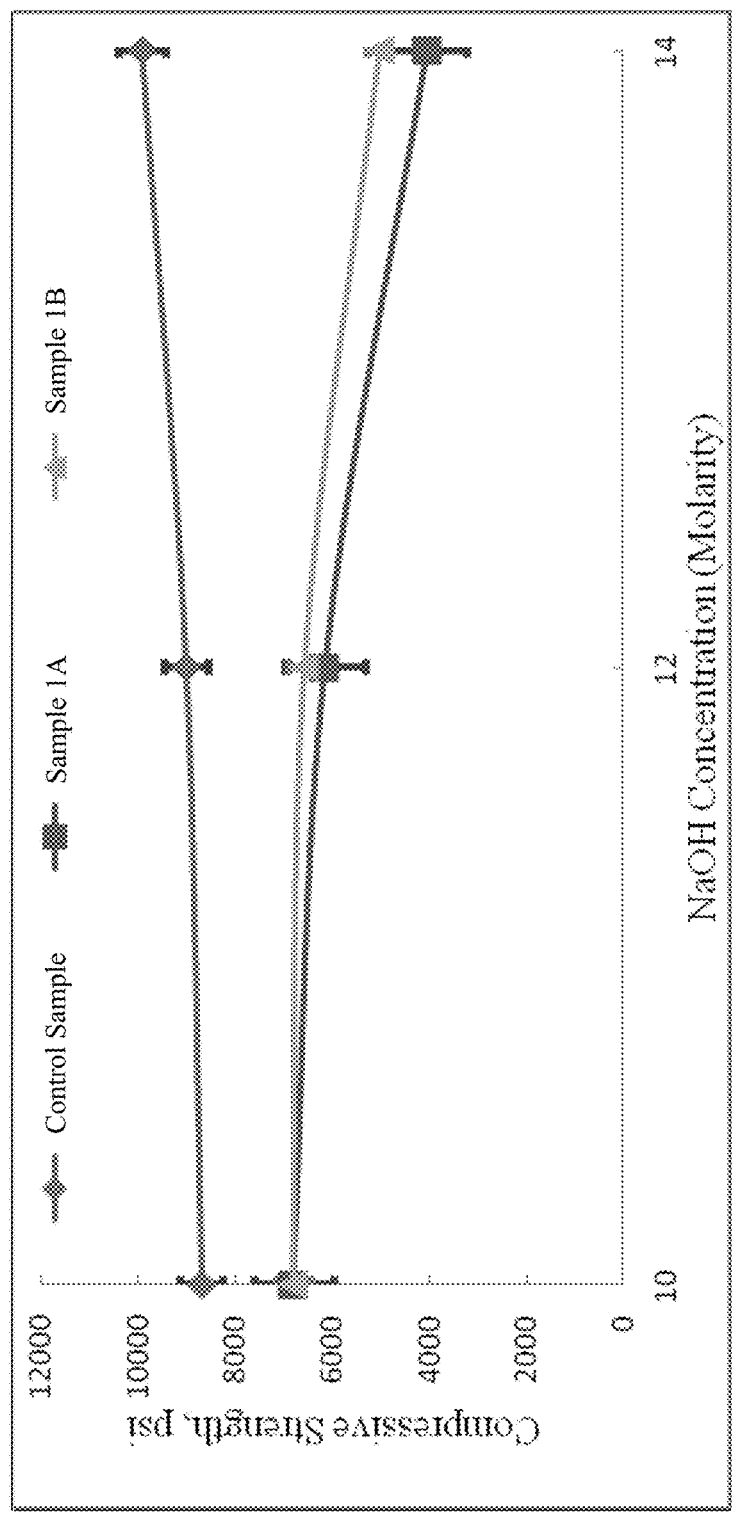
FIG. 21 is a graphical comparison of compressive strength test results for geopolymer paste control samples, geopolymer paste samples 1A, and geopolymer paste samples 1B prepared with 10M, 12M, and 14M sodium hydroxide solutions.

FIG. 21 graphically compares the compressive strength results for the geopolymer paste control samples, geopolymer paste samples 1A, and geopolymer paste samples 1B at each NaOH concentration. Geopolymer paste samples 1A and 1B exhibited significant compressive strength reduction at all NaOH concentrations, with greater loss of compressive strength with increased NaOH concentration. This may be explained by the halloysite nanotubes on the fly ash particles that shields the fly ash particles from attack by the sodium hydroxide solution. Also, as the hydroxide ions were consumed attacking the halloysite nanotubes surrounding the fly ash particles, fewer hydroxide ions were available to dissolve the fly ash particles, resulting in the formation of less geopolymer.

Flowability tests were conducted on geopolymer mortar samples made with 10M, 12M, and 14M sodium hydroxide solutions. Tests were conducted according to ASTM C-1437 utilizing the flow table specified in ASTM C-230. Table 2 shows the results of the flowability tests.

Figure 22:
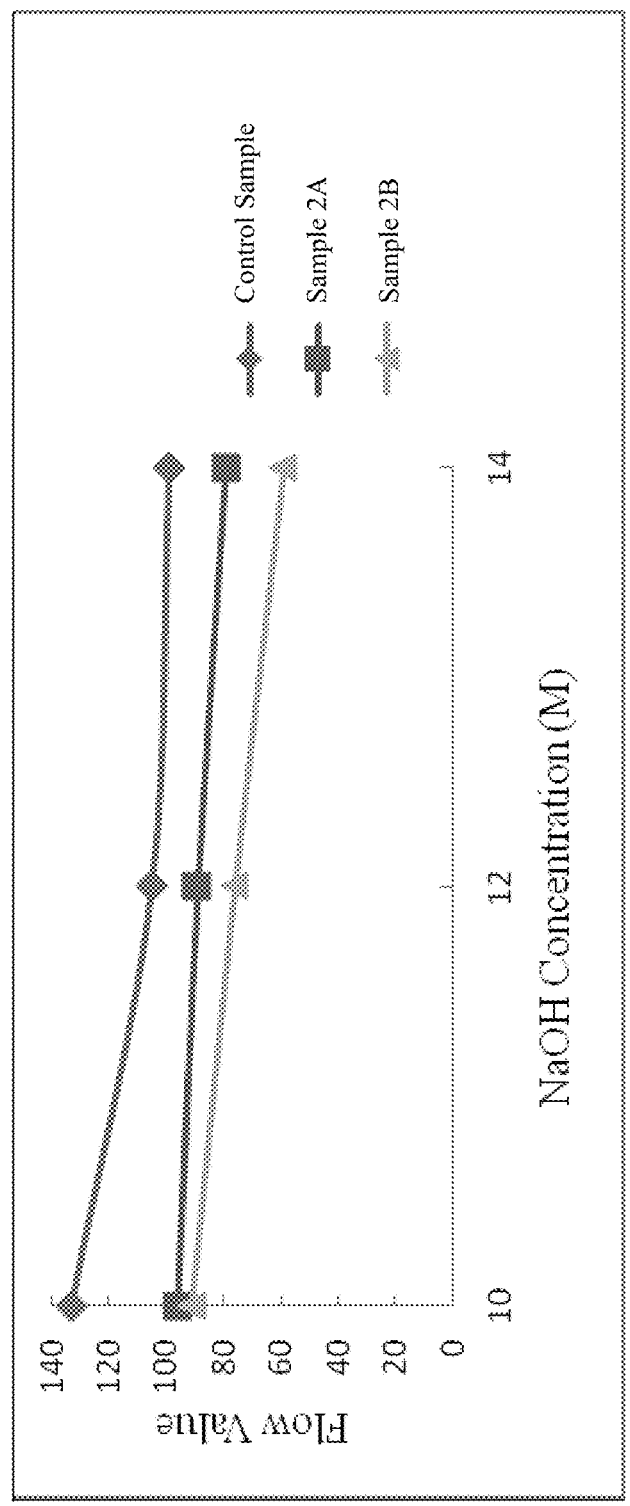
FIG. 22 is a graphical comparison of flowability test results for geopolymer mortar control samples, geopolymer mortar samples 2A, and geopolymer mortar samples 2B prepared with 10M, 12M, and 14M sodium hydroxide solutions.
Figure 23:
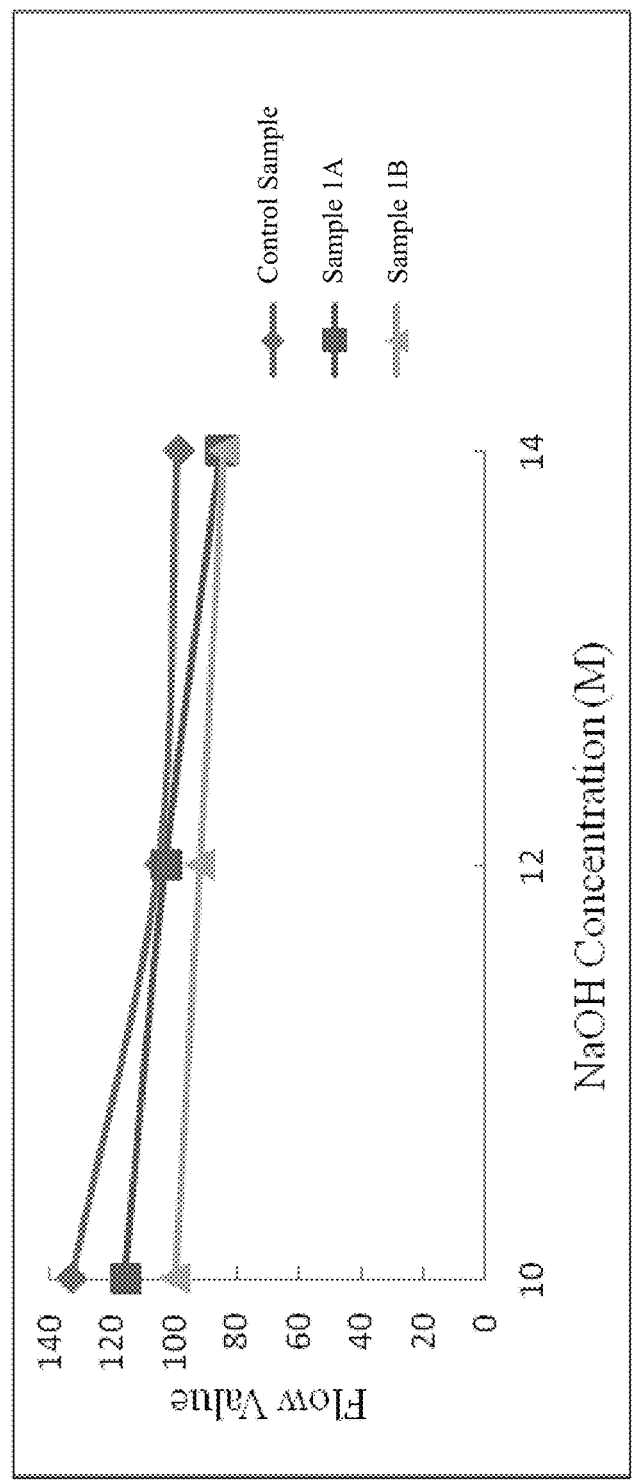
FIG. 23 is a graphical comparison of flowability test results for geopolymer mortar control samples, geopolymer mortar samples 1A, and geopolymer mortar samples 1B prepared with 10M, 12M, and 14M sodium hydroxide solutions.

FIG. 22 graphically compares the flowability results for the geopolymer mortar control samples, geopolymer mortar samples 2A, and geopolymer mortar samples 2B at each NaOH concentration. FIG. 23 graphically compares the flowability results for the geopolymer mortar control samples, geopolymer mortar samples 1A, and geopolymer mortar samples 1B at each NaOH concentration. FIGS. 22 and 23 show that increased amounts of halloysite nanotubes and increased concentration of the sodium hydroxide solution resulted in decreased flow values for the geopolymer mortar samples.

Figure 24:
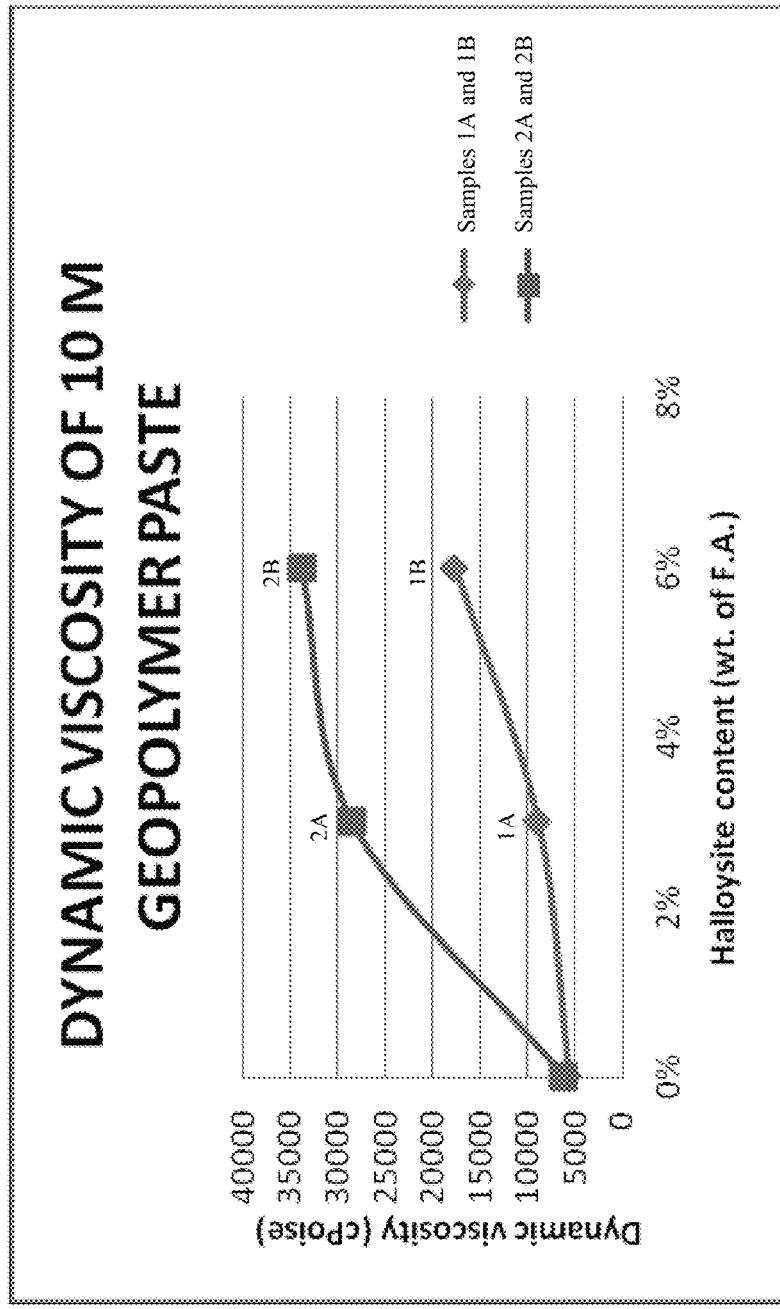
FIG. 24 is a graphical comparison of dynamic viscosity test results for geopolymer paste control samples, geopolymer paste samples 1A, geopolymer paste samples 1B, geopolymer paste samples 2A, and geopolymer paste samples 2B, each prepared with a 10M sodium hydroxide solution.
Figure 25:
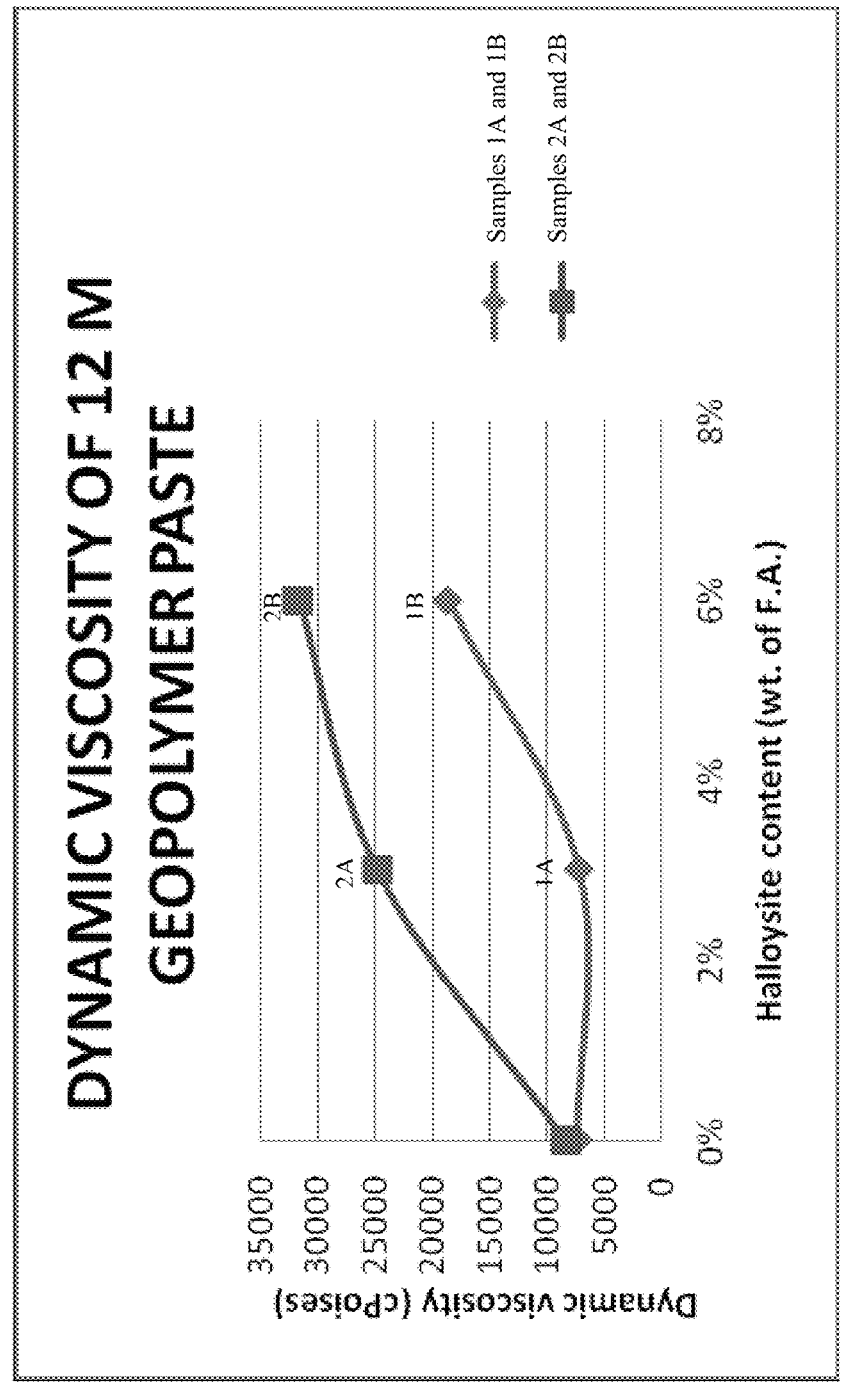
FIG. 25 is a graphical comparison of dynamic viscosity test results for geopolymer paste control samples, geopolymer paste samples 1A, geopolymer paste samples 1B, geopolymer paste samples 2A, and geopolymer paste samples 2B, each prepared with a 12M sodium hydroxide solution.
Figure 26:
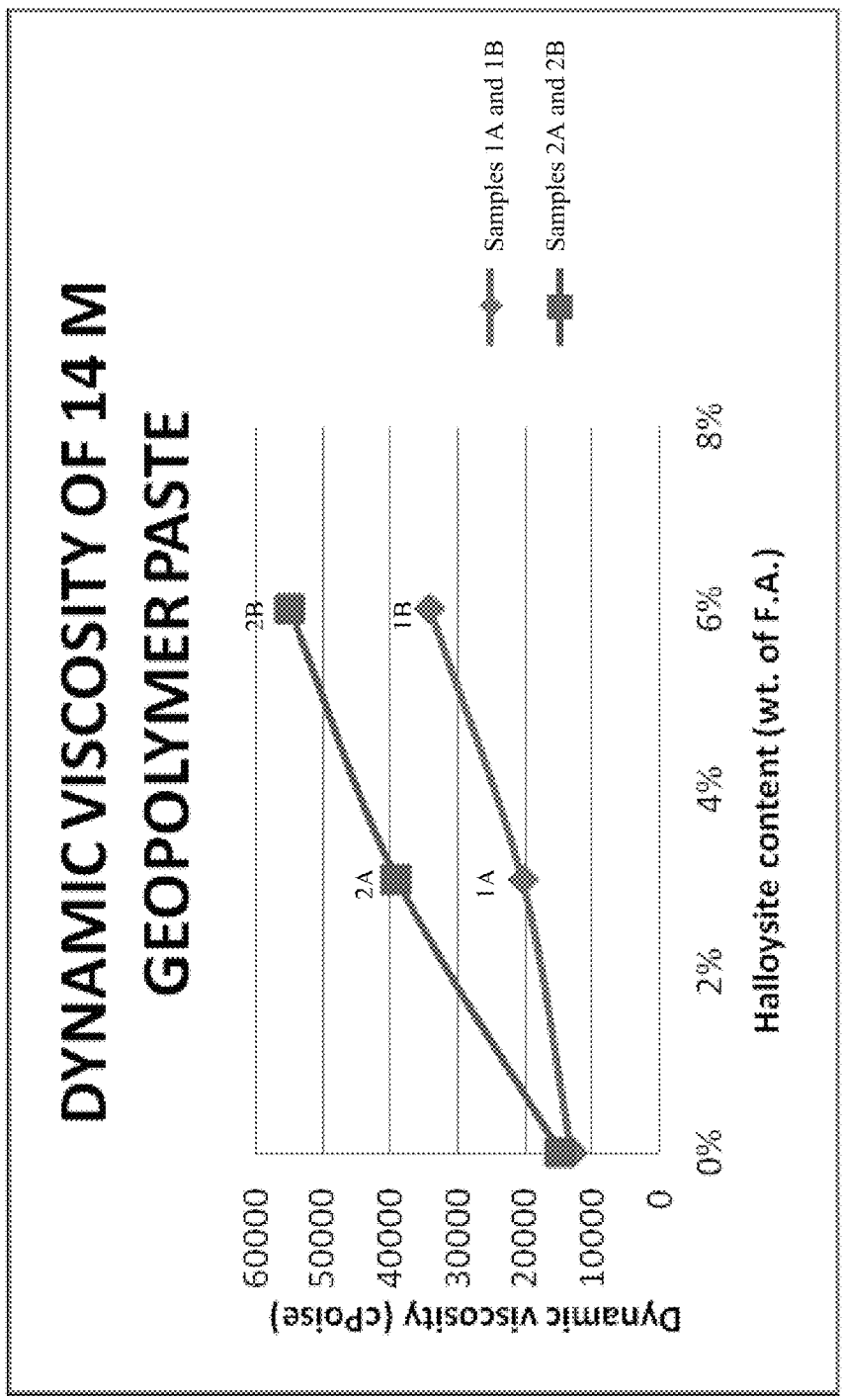
FIG. 26 is a graphical comparison of dynamic viscosity test results for geopolymer paste control samples, geopolymer paste samples 1A, geopolymer paste samples 1B, geopolymer paste samples 2A, and geopolymer paste samples 2B, each prepared with a 14M sodium hydroxide solution.

Dynamic viscosity tests were conducted on geopolymer paste samples using a Brookfield DV-III Ultra Rheometer. A small sample adapter and an SV4-27 spindle were selected for all experiments. The mixing speed was set at 5 RPM. FIG. 24 graphically compares the dynamic viscosity values of geopolymer paste control samples, geopolymer paste samples 1A, geopolymer paste samples 1B, geopolymer paste samples 2A, and geopolymer paste samples 2B, each prepared with a 10M sodium hydroxide solution. Similarly, FIG. 25 graphically compares the dynamic viscosity values of all of these geopolymer paste samples prepared with a 12M sodium hydroxide solution, and FIG. 26 graphically compares the dynamic viscosity values of all of these geopolymer paste samples prepared with a 14M sodium hydroxide solution. FIGS. 24-26 show that increased amounts of halloysite nanotubes increased the viscosity of the geopolymer paste samples in all cases. But the mixing procedure is shown to significantly impact the viscosity of the resulting geopolymer paste. For example, for each sodium hydroxide solution concentration, geopolymer paste sample 2A in which the halloysite nanotubes were added directly to the geopolymer paste had a significantly higher viscosity than geopolymer paste sample 1A in which the same amount of halloysite nanotubes were premixed with the fly ash.

Figure 27:
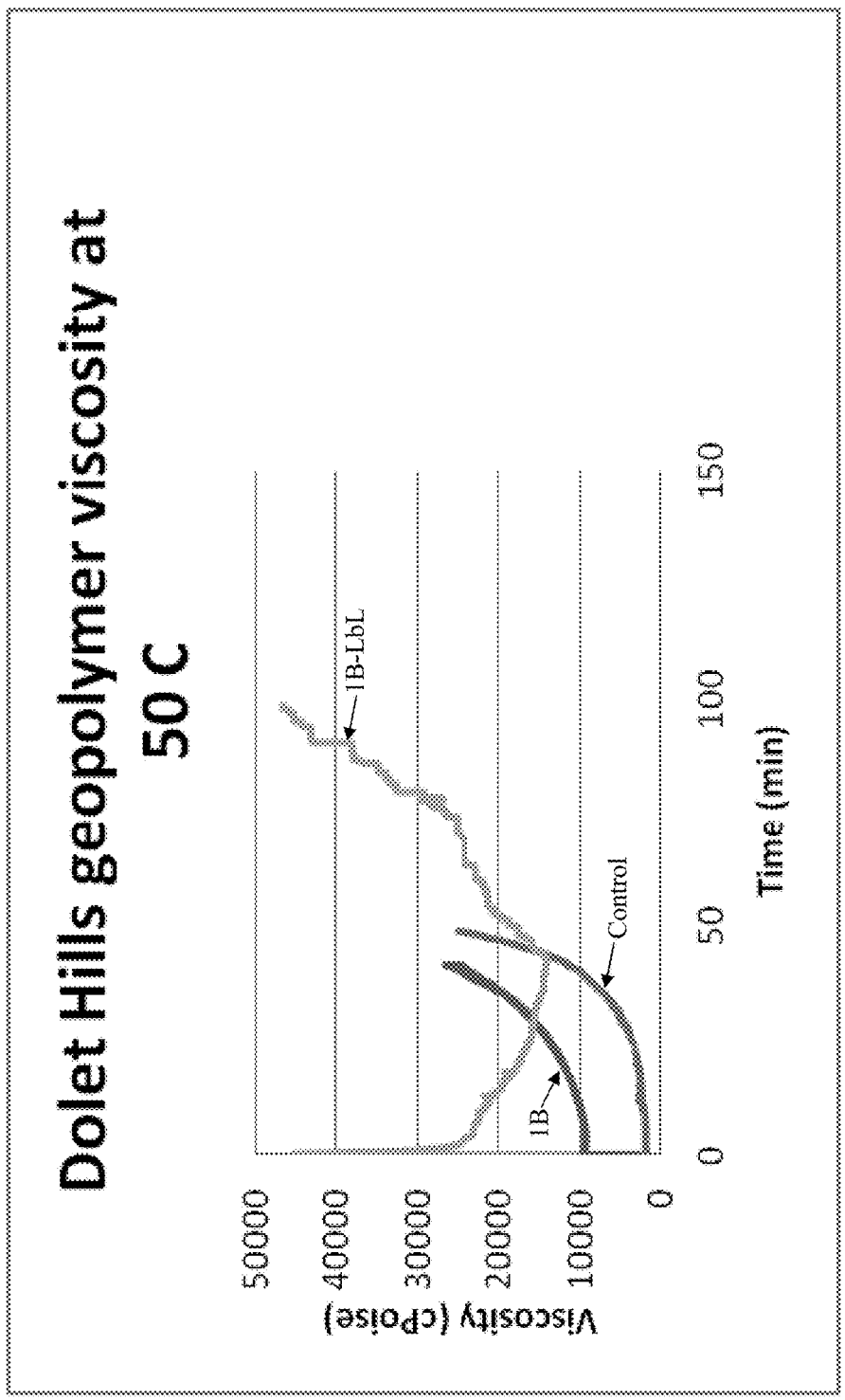
FIG. 27 is a graphical comparison of dynamic viscosity test results for geopolymer paste control samples, geopolymer paste samples 1B, and geopolymer paste samples 1B-LbL, each prepared with Dolet Hills fly ash.

Dynamic viscosity measurements were also conducted on geopolymer paste sample 1B and geopolymer paste sample 1B-LbL at an elevated temperature of 50° C. The same rheometer and test procedure was used. FIG. 27 graphically compares the dynamic viscosity of a geopolymer paste control sample, a geopolymer paste sample 1B, and a geopolymer paste sample 1B-LbL, with each sample having been prepared with Dolet Hills fly ash having a negative zeta potential. Results reveal that the geopolymer paste sample 1B-LbL exhibited a thixotropic behavior even at 50° C., due

TABLE 2

| NaOH Soln. Conc. | Geopolymer Mortar Control | Geopolymer Mortar 1A (3% halloysite) | Geopolymer Mortar 1B (6% halloysite) | Geopolymer Mortar 2A (3% halloysite) | Geopolymer Mortar 2B (6% halloysite) |
|---|---|---|---|---|---|
| 10M | 133 | 116 | 100 | 96 | 91 |
| 12M | 105 | 108 | 92 | 89 | 76 |
| 14M | 99 | 85 | 84 | 79 | 59 | to the protection against early setting provided by the halloysite nanotubes and the LbL polyelectrolyte system. On the other hand, the geopolymer paste sample 1B exhibited a behavior similar to that of the geopolymer paste control sample.

Figure 28:
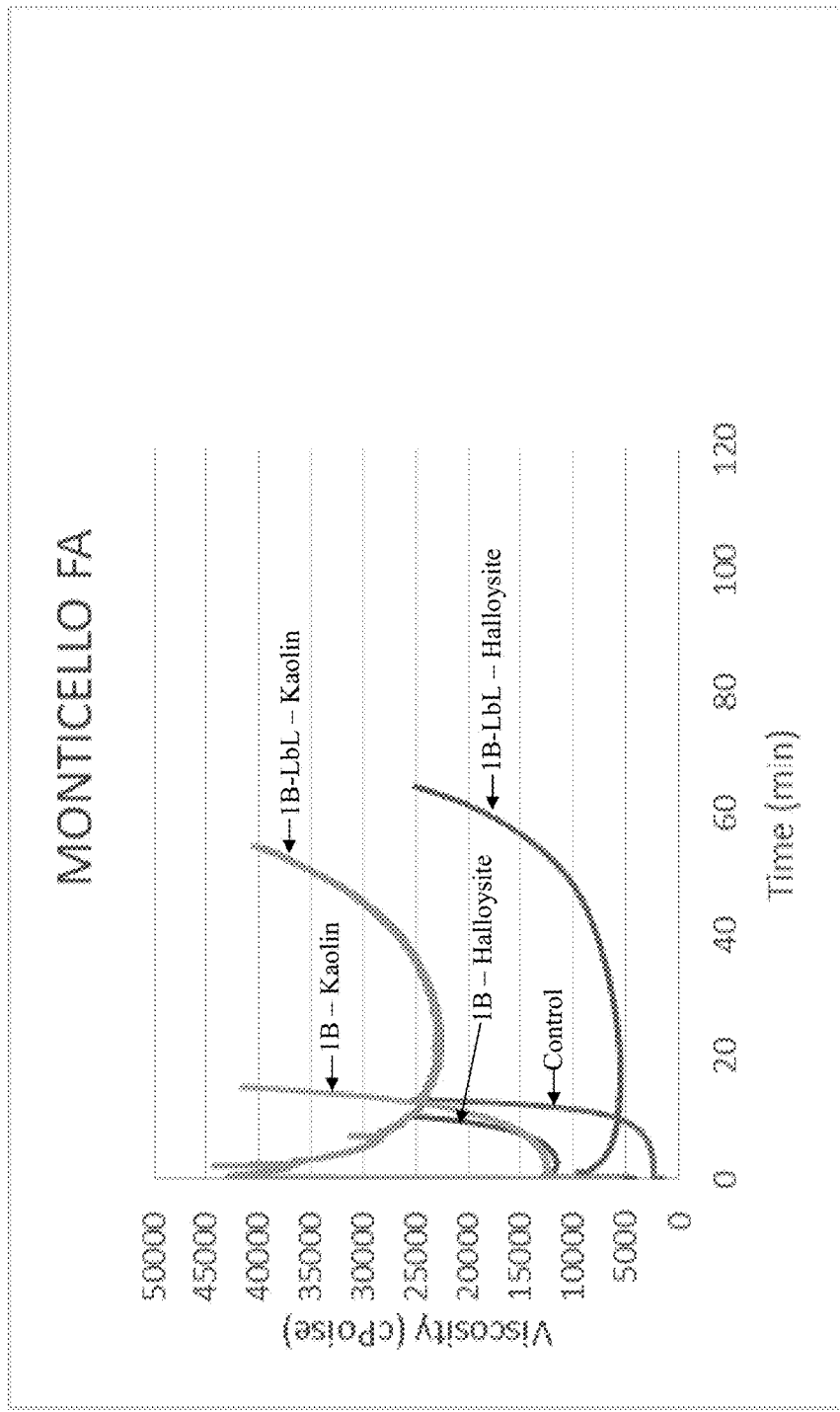
FIG. 28 is a graphical comparison of dynamic viscosity test results for geopolymer paste control samples, geopolymer paste samples 1B prepared with halloysite nanotubes and kaolin nanoclay particles, and geopolymer paste samples 1B-LbL prepared with halloysite nanotubes and kaolin nanoclay particles, each prepared with Monticello fly ash.

Dynamic viscosity measurements were conducted on geopolymer paste samples prepared with Monticello fly ash having a negative zeta potential. The same test procedure was followed except that the temperature was 23° C. FIG. 28 shows the results for a geopolymer paste control sample, a geopolymer paste sample 1B prepared with halloysite nanotubes, a geopolymer paste sample 1B-LbL prepared with halloysite nanotubes, a geopolymer paste sample 1B prepared with kaolin nanoclay particles, and a geopolymer paste sample 1B-LbL prepared with kaolin nanoclay particles. These results show that the geopolymer paste samples 1B-LbL formed with halloysite nanotubes and kaolin nanoclay particles both exhibited a thixotropic behavior, while the corresponding geopolymer paste samples 1B both exhibited behaviors similar to that of the geopolymer paste control sample.

TABLE 3

| | Geopolymer Paste Control | Geopolymer Paste 1A (3% halloysite) | Geopolymer Paste 1B (6% halloysite) | Geopolymer Paste 2A (3% halloysite) | Geopolymer Paste 2B (6% halloysite) |
|---|---|---|---|---|---|
| Initial Setting Time | 18 min. 24 sec | 70 min 35 sec | 175 min | 47 min 55 sec | 117 min |
| Final Setting Time | 25 min 43 sec | 85 min 45 sec | 205 min | 49 min 49 sec | 147 min |

Vicat needle setting time tests were conducted with geopolymer paste samples made with Monticello fly ash and a 10M sodium hydroxide solution. Table 3 shows the setting time results. The addition of halloysite nanotubes resulted in longer setting times in all geopolymer paste samples than in the geopolymer paste control samples. Geopolymer paste sample 1A in which the halloysite nanotubes were premixed with the fly ash had a longer setting time than geopolymer paste sample 2A in which the same amount of halloysite nanotubes were mixed with the geopolymer paste. Similarly, geopolymer paste sample 1B in which the halloysite nanotubes were premixed with the fly ash had a longer setting time than geopolymer paste sample 2B in which the same amount of halloysite nanotubes were mixed with the geopolymer paste. Geopolymer paste sample 1B having 6% halloysite nanotubes by weight of the fly ash had a longer setting time than geopolymer paste sample 1A having 3% halloysite nanotubes by weight of the fly ash, where both samples were prepared by premixing the halloysite nanotubes with the fly ash. These results show that the shielding effect of the halloysite nanotubes partially or comprehensively coating the fly ash particles increases the setting time of the geopolymer paste.

Preparing a geopolymer paste with a 10M sodium hydroxide solution and premixing with the fly ash 6% halloysite nanotubes by weight of the fly ash, results in a geopolymer paste having an initial setting time of nearly three hours, flowability of 100 and a 24-hour compressive strength over 6,000 psi (using a proper force currying procedure). Similarly, preparing a geopolymer paste with a 10M sodium hydroxide solution and premixing with the fly ash 3% halloysite nanotubes by weight of the fly ash, results in a geopolymer paste having an initial setting time of 70 minutes, flowability of 116 and a 24-hour compressive strength over 6,000 psi (using a proper force currying procedure). The incorporation of halloysite nanotubes into a geopolymer by premixing with the fly ash or by addition to the paste greatly simplifies the utilization of geopolymer binders in large scale cast-in-place pours. Premixing the halloysite nanotubes with the fly ash results in coating a greater percentage of the fly ash particle surfaces with halloysite nanotubes, better workability, and longer setting times than adding the halloysite nanotubes directly to the geopolymer paste.

A method of controlling the setting time of a geopolymer includes partially or comprehensively coating aluminosilicate particles (e.g., fly ash, metakaolin, or rice husk) with nanoparticles (e.g., halloysite nanotubes or kaolin nanoclay particles) before mixing the aluminosilicate particles with sodium silicate and a sodium hydroxide solution to form a geopolymer. The nanoparticles act as retardants by slowing the geopolymerization reaction. The nanoparticles may form about 1% to about 4% by weight of the geopolymer. The method may further include treating the aluminosilicate particles with a layer-by-layer assembly of polyelectrolytes before coating the aluminosilicate particles with nanoparticles in order to enhance the coating effectiveness of the nanoparticles on the surface of the aluminosilicate particles.

A geopolymer may be formed by mixing about 39% to about 66% by weight aluminosilicate source, about 0% to about 40% by weight sand, about 19% to about 33% by weight alkali activator solution, and about 1% to about 4% by weight nanoparticle retardant.

In one embodiment, the geopolymer may be formed by mixing about 64% to about 66% by weight aluminosilicate source, about 32% to about 33% by weight alkali activator solution, and about 1% to about 4% by weight nanoparticles. In another embodiment, the geopolymer may be formed by mixing about 39% to about 40% by weight aluminosilicate source, about 39% to about 40% by weight sand, about 19% to about 20% by weight alkali activator solution, and about 1% to about 3% by weight nanoparticles. The aluminosilicate source may be fly ash, metakaolin, or rice husk. The alkali activator solution may include sodium silicate and a sodium hydroxide solution having a concentration in the range of about 10M to about 14M. The alkali activator solution may have a sodium silicate to sodium hydroxide ratio of about 1.5. The geopolymer may have a setting time of about 47 minutes to about 205 minutes, and a 24-hour compressive strength of about 4,000 psi to about 8,600 psi. The flowability of the geopolymer may be about 59 to about 116.

A geopolymer may be prepared by mixing aluminosilicate particles with nanoparticles to form a first mixture in which the nanoparticles partially or comprehensively coat the aluminosilicate particles, mixing sodium silicate with the first mixture to form a second mixture, and mixing a sodium hydroxide solution with the second mixture until a substantially homogeneous mixture is achieved. The aluminosilicate source may form about 39% to about 66% by weight of the geopolymer. The nanoparticles may form about 1% to about 4% by weight of the geopolymer. The sodium silicate may form about 11% to about 20% by weight of the geopolymer, and the sodium hydroxide solution may form about 7% to about 14% by weight of the geopolymer. Each mixing step may be performed for about 30 seconds. The nanoparticles may include halloysite nanotubes or kaolin nanoclay particles. In one embodiment, sand may be mixed with the second mixture before the sodium hydroxide solution is added, such that the sand forms about 39% to about 40% by weight of the geopolymer, the nanoparticles form about 39% to about 40% by weight of the geopolymer, the sodium silicate forms about 11% to about 12% by weight of the geopolymer, the sodium hydroxide solution forms about 7% to about 8% by weight of the geopolymer, and the halloysite nanotubes form about 1% to about 3% by weight of the geopolymer.

Alternatively, a geopolymer may be prepared by mixing aluminosilicate particles with sodium silicate to form a first mixture, mixing a sodium hydroxide solution with the first mixture to form a second mixture, and mixing nanoparticles with the second mixture until a substantially homogeneous mixture is achieved. The aluminosilicate particles may form about 39% to about 66% by weight of the geopolymer. The nanoparticles may form about 1% to about 4% by weight of the geopolymer. The sodium silicate may form about 11% to about 20% by weight of the geopolymer, and the sodium hydroxide solution may form about 7% to about 14% by weight of the geopolymer. Each mixing step may be performed for about 30 seconds. In one embodiment, sand may be mixed with the first mixture before the sodium hydroxide solution is added, such that the sand forms about 39% to about 40% by weight of the geopolymer, the aluminosilicate particles form about 39% to about 40% by weight of the geopolymer, the sodium silicate forms about 11% to about 12% by weight of the geopolymer, the sodium hydroxide solution forms about 7% to about 8% by weight of the geopolymer, and the nanoparticles form about 1% to about 3% by weight of the geopolymer.

The geopolymer formed with the nanoparticle retardant may be used to allow increased time for properly mixing, transporting, pouring, placing, and finishing geopolymer materials in construction applications. Additionally, the rheology of this geopolymer paste at moderately elevated temperatures (e.g., between 50° C. and 350° C. or between 120° F. and 660° F.) allows for use of this geopolymer in ambient temperature settings as well as in elevated temperature settings, such as cementing of oil and gas exploration and production wellbores where flash setting may occur with other geopolymers. This geopolymer may offer superior quality when installed as a grout to seal the annular space between the wellbore soil surface and the casing.

The embodiments shown in the drawings and described above are exemplary of numerous embodiments that may be made within the scope of the appended claims. It is contemplated that numerous other configurations may be used, and the material of each component may be selected from numerous materials other than those specifically disclosed. In short, it is the applicant's intention that the scope of the patent issuing herefrom will be limited only by the scope of the appended claims.

The invention claimed is:

1. A composition of matter formed by the mixing of components comprising:
   about 39% to about 66% by weight aluminosilicate source;
   about 0% to about 40% by weight sand;
   about 19% to about 33% by weight alkali activator solution; and
   about 1% to about 4% by weight nanoparticle retardant.

2. The composition of matter of claim 1, wherein the aluminosilicate source comprises fly ash, metakaolin, or rice husk.

3. The composition of matter of claim 1, wherein the alkali activator solution comprises sodium silicate and a sodium hydroxide solution.

4. The composition of matter of claim 3, wherein a concentration of the sodium hydroxide solution is in the range of about 10M to about 14M.

5. The composition of matter of claim 3, wherein the alkali activator solution comprises a silicate to hydroxide ratio of about 1.5.

6. The composition of matter of claim 1, wherein the nanoparticle retardant comprises halloysite nanotubes or kaolin nanoclay particles.

7. The composition of matter of claim 1, wherein the composition is formed by mixing of components comprising:
   about 64% to about 66% by weight aluminosilicate source;
   about 32% to about 33% by weight alkali activator solution; and
   about 1% to about 4% by weight nanoparticle retardant.

8. The composition of matter of claim 1, wherein the composition is formed by mixing of components comprising:
   about 39% to about 40% by weight aluminosilicate source;
   about 39% to about 40% by weight sand;
   about 19% to about 20% by weight alkali activator solution; and
   about 1% to about 3% by weight nanoparticle retardant.

9. The composition of matter of claim 1, wherein a setting time of the composition is about 47 minutes to about 205 minutes.

10. The composition of matter of claim 9, wherein the compressive strength of the composition 24 hours after mixing is about 4,000 psi to about 8,600 psi.

11. The composition of matter of claim 1, wherein the flowability of the composition is about 59 to about 116.

* * * * *